(12) United States Patent
Vaughn et al.

(10) Patent No.: US 11,737,389 B2
(45) Date of Patent: Aug. 29, 2023

(54) DRIVE WHEEL COVER FOR WHEELED MACHINE

(71) Applicant: Honda Motor Co., Ltd., Tokyo (JP)

(72) Inventors: Christopher W. Vaughn, Mebane, NC (US); Nathaniel A. Lenfert, Graham, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 333 days.

(21) Appl. No.: 17/036,677

(22) Filed: Sep. 29, 2020

(65) Prior Publication Data

US 2022/0095536 A1    Mar. 31, 2022

(51) Int. Cl.
| | | |
|---|---|---|
| A01D 34/74 | (2006.01) | |
| A01D 34/81 | (2006.01) | |
| A01D 34/69 | (2006.01) | |
| A01D 69/06 | (2006.01) | |
| A01D 34/68 | (2006.01) | |
| B60B 7/08 | (2006.01) | |

(52) U.S. Cl.
CPC ............. *A01D 34/74* (2013.01); *A01D 34/81* (2013.01); *B60B 7/08* (2013.01); *A01D 34/69* (2013.01); *A01D 69/06* (2013.01); *A01D 2034/6837* (2013.01)

(58) Field of Classification Search
CPC ........ A01D 34/74; A01D 34/81; A01D 34/69; A01D 69/06; A01D 2034/6837; B60B 7/08; B60B 27/04; B60B 2900/5112
USPC .................................................... 301/37.105
See application file for complete search history.

(56) References Cited

U.S. PATENT DOCUMENTS

| | | | | |
|---|---|---|---|---|
| 4,212,364 A | * | 7/1980 | Dobberpuhl | B62D 51/04 |
| | | | | 280/43 |
| 4,785,612 A | * | 11/1988 | Morishita | A01D 34/69 |
| | | | | 56/11.8 |
| 4,811,552 A | * | 3/1989 | Fujimoto | A01D 34/69 |
| | | | | 56/11.8 |
| 6,434,918 B1 | * | 8/2002 | Csonka | A01D 34/826 |
| | | | | 56/13.4 |
| 6,857,709 B1 | * | 2/2005 | McLean | B60B 7/20 |
| | | | | 301/37.105 |
| 10,034,429 B2 | | 7/2018 | Zheng et al. | |
| 10,524,417 B2 | | 1/2020 | Fan et al. | |
| 10,550,899 B2 | | 2/2020 | Vaughn et al. | |
| 10,605,314 B2 | | 3/2020 | Vaughn et al. | |

(Continued)

FOREIGN PATENT DOCUMENTS

| | | |
|---|---|---|
| CN | 106064549 | 11/2016 |
| DE | 3812105 | 9/1988 |
| EP | 0204433 | 12/1986 |

*Primary Examiner* — Thomas B Will
*Assistant Examiner* — Julia C Tran
(74) *Attorney, Agent, or Firm* — RANKIN, HILL & CLARK LLP (57) ABSTRACT

A lawn mower includes a blade housing and a height adjusting mechanism for adjusting a height of the blade housing with respect to the associated ground. The height adjusting mechanism includes rear wheel support members for supporting rear drive wheels. Each rear drive wheel includes a cover having an exterior cover part and an interior cover part. The interior cover part is directly connected to one of the support members without the use of separate associated mechanical fasteners.

11 Claims, 5 Drawing Sheets

(56) References Cited

U.S. PATENT DOCUMENTS

| | | | |
|---|---|---|---|
| 2003/0152434 A1* | 8/2003 | Forlani | B23Q 1/5462 |
| | | | 409/235 |
| 2007/0227840 A1* | 10/2007 | Smith | F16D 55/226 |
| | | | 188/250 F |
| 2011/0173941 A1* | 7/2011 | Persson | A01D 34/74 |
| | | | 56/320.1 |
| 2019/0223378 A1* | 7/2019 | Fan | A01D 34/6818 |

* cited by examiner

DRIVE WHEEL COVER FOR WHEELED MACHINE

BACKGROUND

In a typical assembly for a manually operated wheeled machine (for example, a lawn mower), a cover for a rear drive wheel is adapted to house or enclose a transmission that drives the drive wheel. With this arrangement, the drive wheel cover protects the transmission from dirt and debris which can cause undue wear and premature end of life. However, known manners for securing the drive wheel cover can provide an intrusive path for dirt and debris into the cover. For example, it is known to secure the drive wheel cover by sandwiching the drive wheel cover between surrounding components; however, during operation of the lawn mower the drive wheel cover can become loose, separating from the surrounding components and exposing the transmission. It is also known to fasten the drive wheel cover to a mating part via mechanical fasteners (e.g., bolts, screws and the like); however, in assembly the fasteners can be overfastened, damaging the drive wheel cover and again exposing the transmission to dirt and debris.

BRIEF DESCRIPTION

According to one aspect, a lawn mower comprises a blade housing and a height adjusting mechanism for adjusting a height of the blade housing with respect to the associated ground. The height adjusting mechanism includes rear wheel support members for supporting rear drive wheels. Each rear drive wheel includes a cover having an exterior cover part and an interior cover part. The interior cover part is directly connected to one of the support members without the use of separate associated mechanical fasteners.

According to another aspect, a walk-behind lawn mower comprises a blade housing and a height adjusting mechanism for adjusting a height of the housing with respect to the associated ground. The height adjusting mechanism includes rear wheel support members for supporting rear drive wheels. The rear drive wheels include covers, each cover having an exterior cover part and an interior cover part. The interior cover part includes at least one connector integrally formed with the interior cover part to define a unitary component, and the at least one connector is configured for a snap-fit connection with each respective support member.

According to another aspect, a walk-behind lawn mower comprises a blade housing and a height adjusting mechanism for adjusting a height of the housing with respect to the associated ground. The height adjusting mechanism includes rear wheel support members for supporting rear drive wheels. The rear drive wheels include covers, each cover having an exterior cover part and an interior cover part. The interior cover part includes plural connectors each integrally formed with the interior cover part to define a unitary component. A first connector of the plural connectors engages an outer peripheral edge of one of the support members. A second connector of the plural connectors extends through an opening in the one support member and engages an inner surface of the one support member.

DETAILED DESCRIPTION

Figure 1:
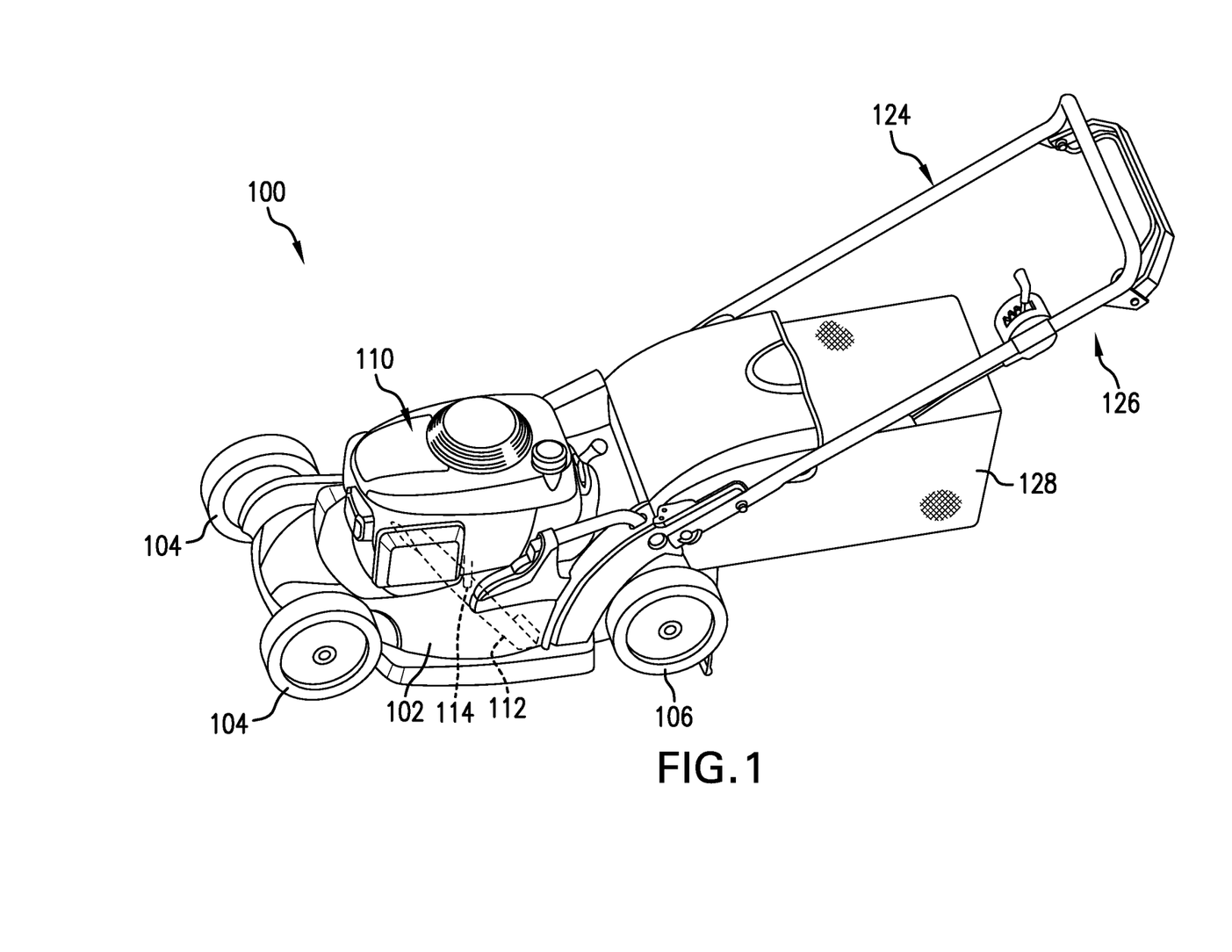
FIG. 1 is a schematic perspective view of a manually operated wheeled machine in the form of a walk-behind self-propelled lawn mower.

It should, of course, be understood that the description and drawings herein are merely illustrative and that various modifications and changes can be made in the structures disclosed without departing from the present disclosure. For purposes of description herein, spatially relative terms relate to the invention as oriented in the figures. Referring now to the drawings, wherein like numerals refer to like parts throughout the several views, FIG. 1 schematically illustrates a walk-behind, self-propelled lawn mower 100 that will be described as an example embodiment of a manually operated wheeled machine according to the present invention. However, it should be noted that the wheeled machine can be a wide variety of manually operated power implements, including various types of lawn mowers, power carriers (i.e., wheelbarrows), snow throwers, and the like; the lawn mower 100 merely exemplifies the present disclosure.

Figure 2:
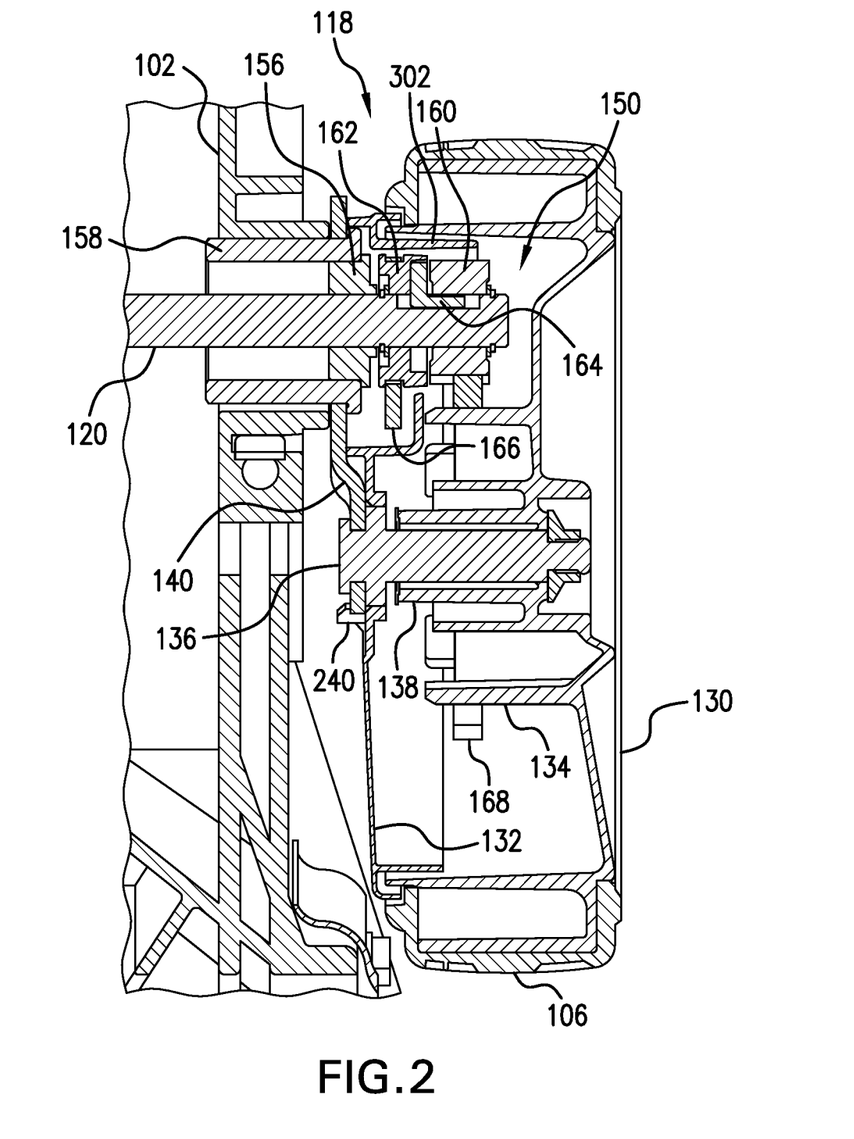
FIG. 2 is a partial cross-sectional view of one of the drive wheels of the lawn mower.
Figure 3:
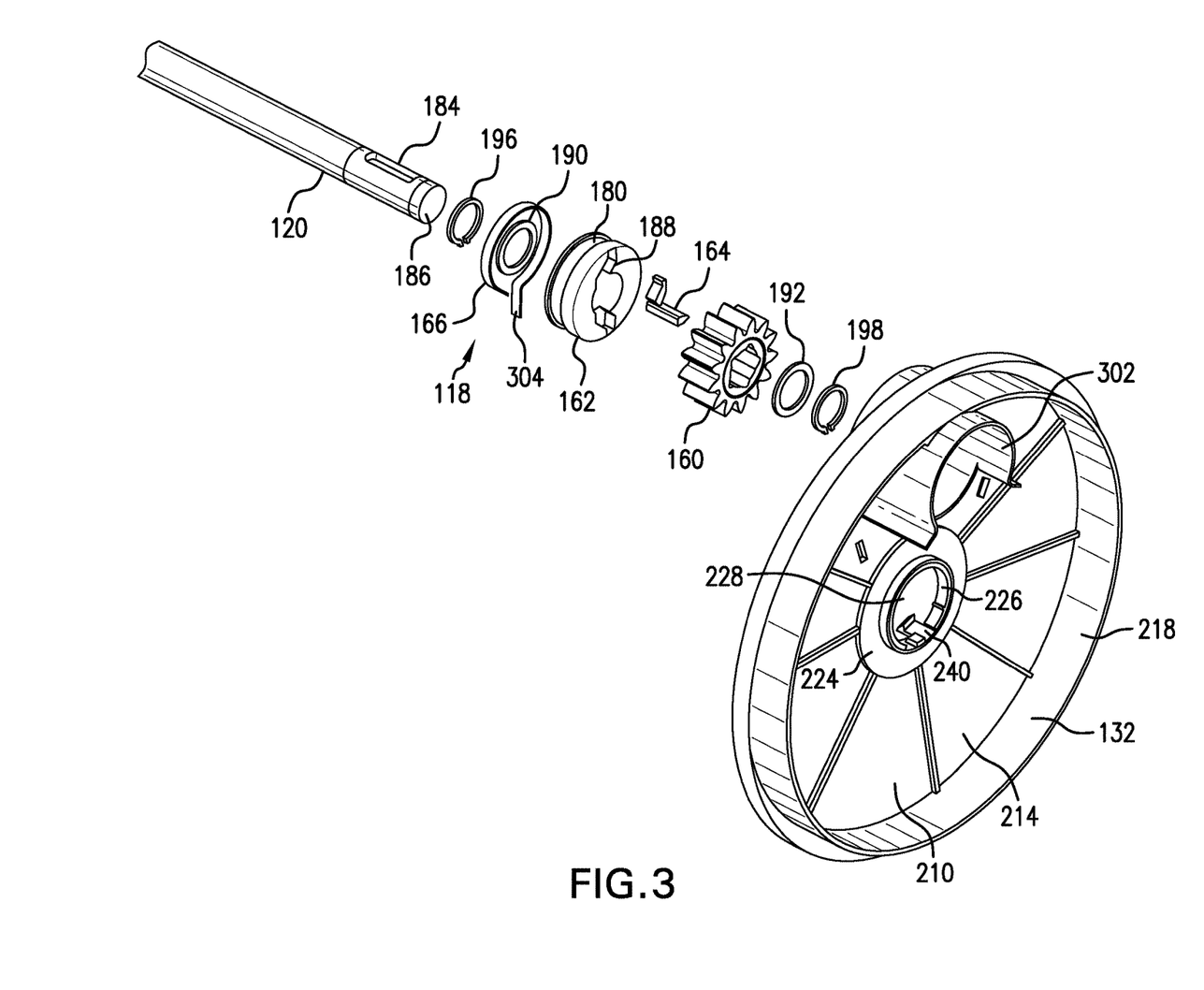
FIG. 3 is an exploded perspective view of a transmission housed in the one drive wheel of FIG. 2.

As schematically illustrated in FIG. 1, the lawn mower 100 has a blade housing 102 carried by front wheels 104 and rear drive wheels 106 (the right rear drive wheel is not shown because FIG. 1 is a view of the lawn mower 100 taken from one side). Mounted atop the housing 102 is a prime mover 110, which is an internal combustion engine in the depicted embodiment, but could alternatively be an electric motor. The housing 102 serves as a chassis for the engine 110 which is bolted to an upper surface of the housing 102. A cutting blade 112 housed in a central interior part of the housing 102 is connected to an output shaft 114 of the engine 110. The engine 110 can be used to automatically drive the rear wheels 106 via a drive unit (not shown) and a transmission 118 (FIGS. 2 and 3) associated with each rear wheel. The drive unit is operably coupled to the output shaft 114, and each rear drive wheel 106 is operably connected to the drive unit via output or drive shafts 120 of the drive unit (only the transmission 118 and the drive shaft 120 of the left rear drive wheel 106 is shown in FIGS. 2 and 3). An operating handle 124 extends obliquely from the rear of the housing 102 in a rearward and upward direction and includes operator controls 126, which are configured to selectively engage and disengage the drive unit. A cut-grass storage unit 128 can be connected to the rear of the housing.

Figure 4:
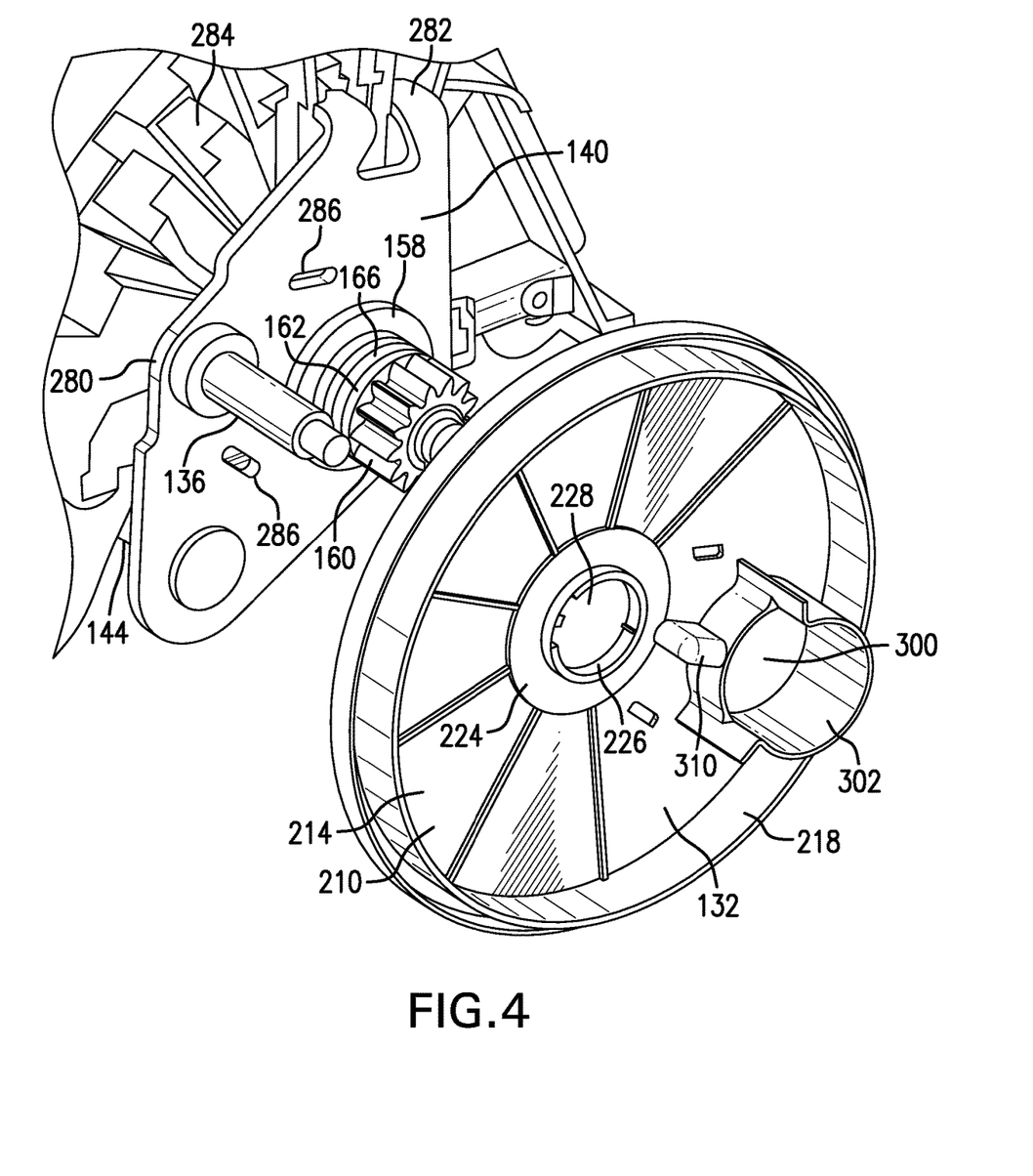
FIG. 4 is a partial exploded perspective view of FIG. 3.
Figure 5:
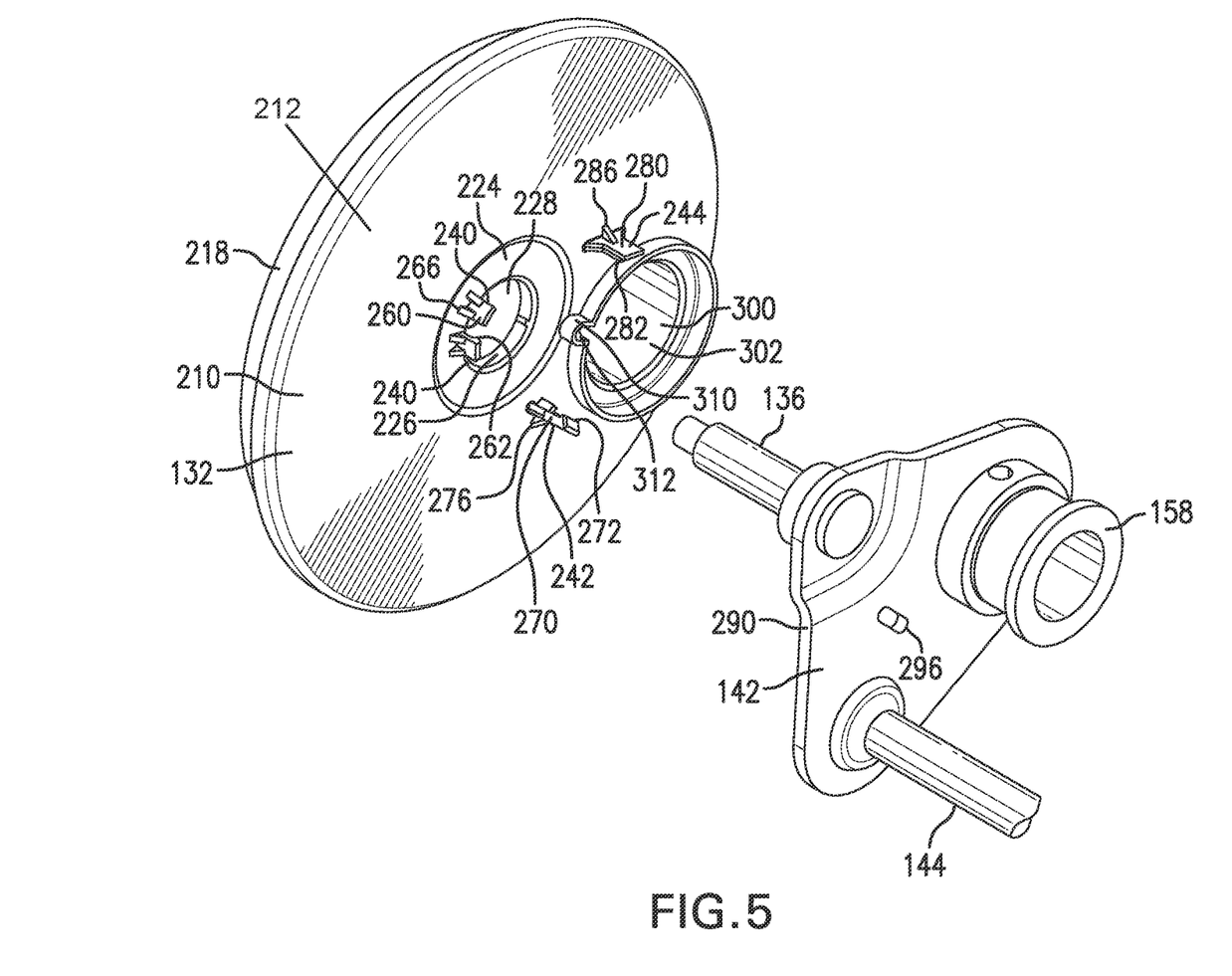
FIG. 5 is a partial exploded perspective view of the other of the drive wheels of the lawn mower.

With reference to FIGS. 2, 4 and 5, each rear drive wheel 106 includes a cover defined by an outside/exterior cover part 130 and an inside/interior cover part 132, each connected to a wheel hub 134. An axle 136 of each drive wheel 106 extends through the inside cover part 132 and is fitted in a tubular part 138 of the hub 134. The axles 136 are secured to adjusting arms or support members 140, 142 associated with a height adjustment mechanism of the lawn mower 100. As is well known, the height adjusting mechanism adjusts the height of the housing 102 and the cutting blade 112 in relation to the associated ground, i.e., the height above the ground. The support members 140, 142 can be interconnected via a connecting rod 144. The interior cover parts 132 of the covers of the rear drive wheels 106 are directly connected to the support members 140, 142. Further, the interior cover part 132 together with the exterior cover part 130 of each cover defines an enclosure 150. The transmission 118 is received in the enclosure 150, and is thereby protected from dirt and debris during operation of the lawn mower 100. Each drive shaft 120 is received in a bearing 156 mounted in a bearing housing 158 that is secured to the respective support member 140, 142. The bearing housings 158 can be also supported by the housing 102.

As best depicted in FIGS. 2 and 3, the transmission 118 associated with each drive wheel 106 of the lawn mower 100 includes a first gear or drive gear 160 rotatably mounted on an end portion of the drive shaft 120, a holder 162 rotatably mounted on the end portion of the drive shaft 120 immediately adjacent the drive gear 160, a ratchet 164 in selective engagement with the drive gear 160 and the holder 162, and a friction member 166 (e.g., a spring member) configured to be at least partially wrapped about an outer peripheral surface of the holder 162. A second gear or driven gear 168 is fixedly mounted on the hub 134 coaxially with a rotational axis of each drive wheel 106 and is meshingly engaged with the drive gear 160. The transmission 118 acts to transmit power from the drive shaft 120, through the driven gear 168, to the drive wheel 106. The transmission 118 is configured to allow the drive wheel 106 to bidirectionally freewheel when the drive shaft 120 is stationary (i.e., the drive shaft is not rotated by the drive unit).

In assembly, the holder 162 is positioned onto the drive shaft 120 with the friction member 166 received in a circumferential recess 180 of the holder 162. A key portion of the ratchet 154 is received in a close-ended channel 184 formed in an end portion 186 of the drive shaft 120. A leg portion of the ratchet 164 is received in a relief 188 formed in the holder 162. The drive gear 160 is positioned onto the drive shaft 120 adjacent the holder 162. A washer 190 is secured by the holder 162, and a washer 192 is secured by the drive gear 160. Snap rings 196, 198 fitted into circumferential grooves on the drive shaft 120 secure the transmission 118 to the drive shaft 120. Further details of the transmission 118 are described in U.S. Pat. No. 10,550,899, assigned to Honda Motor Co., Ltd., the disclosure being incorporated herein by reference.

As indicated, each cover for the rear drive wheels 106 includes the exterior cover part 130, which defines an outer surface of the rear drive wheel, and the interior cover part 132, which defines an inner surface of the rear drive wheel that faces the blade housing 102. With reference to FIGS. 4 and 5, the interior cover part 132 of each rear drive wheel cover includes a base wall 210 having an inner surface 212 and an outer surface 214. The inner surface 212 faces the respective support member 140, 142 and the outer surface 214 faces the exterior cover part 130. A flange or rim 218 extends about a peripheral edge portion of the base wall 210. The base wall 210 is provided with a central hub 224 having an inner wall portion 226 that defines a first opening 228 sized to receive the axle 136. The central hub 224 can be recessed from the inner surface 212 of the base wall as depicted in FIG. 5 for fit with the support member; although, this is not required.

In contrast to the above described known manners for connecting drive wheel covers to support members of the height adjusting mechanism, the exemplary covers of the rear drive wheels 106 are configured such that each interior cover part 132 is directly connected via a snap-fit connection to one of the support members 140, 142 without the use of separate associated mechanical fasteners (e.g., bolts, screws and the like). To provide for the snap-fit connection to the support members 140, 142, each interior cover part 132 includes at least one connector which is integrally formed with the interior cover part to define a unitary component. In the depicted aspect of the interior cover part 132, the at least one connector is plural connectors, each integrally formed with the interior cover part 132 and adapted to engage the support member 140, 142. According to the present embodiment, the plural connectors include a first connector 240 extended from the inner wall portion 226 of the central hub 224, a second connector 242 extended from the inner surface 212 of the base wall 210, and a third connector 244 also extended from the inner surface 212 of the base wall 210. In FIG. 5, the interior cover part 132 can include a pair of first connectors 240 which are circumferentially spaced on the inner wall portion 226; although, this is not required. The first connector 240 is a generally check-shaped connector with an arm 250 having one end portion integral with the inner wall portion 226 and an opposite end portion provided with a protrusion, detent, or barb 252. Gussets 256 can be formed between the central hub 224 and the arm 250 to provide strength and rigidity to the first connector 240. The second connector 242 and the third connector 244 can be shaped similar to the first connector 240. As shown, each of the second connector 242 and third connector 244 includes a respective arm 260, 270 having one end portion integral with the inner surface 212 of the base wall 210 and an opposite end portion provided with a protrusion, detent, or barb 262, 272. Again, gussets 266, 276 can be formed between the inner surface 212 and the respective arm 260, 270 to provide strength and rigidity to the second and third connectors 242, 244.

Each support member 140, 142 is generally plate shaped with the axle 136 and bearing housing 158 secured thereto. The support member 140 includes an outer peripheral edge 280 with prongs 282 projected outward therefrom for selective engagement with a height adjustment plate 284 of the height adjustment mechanism. Further, the support member 140 includes openings 286 for connection with the interior cover part 132. The support member 142 includes an outer peripheral edge 290 and an opening 296 for connection with the interior cover part 132. To directly connect the interior cover part 132 of one of the rear drive wheel covers to the support member 140, the axle 136 is positioned in the first opening 228 of the central hub 224 with first connector 240 elongated along an axial length of the axle 136. The axle 136 located near the outer peripheral edge 280 allows for engagement of the first connector 240 with the outer peripheral edge 280 of the support member 140. The second connector 242 and third connector 244 extend through the openings 286 and engage an inner surface of the support member 140 (i.e., the surface facing away from the interior cover part 132). To directly connect the interior cover part 132 of the other of the rear drive wheel covers to the support member 142, the axle 136 is again positioned in the first opening 228 of the central hub 224 with first connector 240 elongated along an axial length of the axle 136. The axle 136 located near the outer peripheral edge 290 allows for engagement of the first connector 240 with the outer peripheral edge 290 of the support member 142. The second connector 242 extends through the opening 296 and engages an inner surface of the support member 142. With the generally triangular shape of the support member 142, the third connector 244 also engages the outer peripheral edge 290. Accordingly, the present disclosure uses the interior cover part 132 of the rear drive wheel covers with the above described snap-fit connection to grip the mating support members 140, 142 of the height adjusting mechanism to create a tight fit and treacherous path for dust intrusion into the enclosures 150 of the covers that house the transmissions 118.

Further, the bearing housing 158 secured to each support member 140, 142 extends through a second opening 300 in the interior cover part 132 of each rear drive wheel cover. The outer surface 214 of the interior cover part 132 includes a shroud 302 at least partially surrounding the second opening 300. As depicted in FIG. 3, the shroud 302 covers each of the drive gear 160 and the holder 162 of the transmission 118 extended into the enclosure 150 to further prevent dirt and debris from the transmission. Further, with reference to FIGS. 4 and 5, to secure a free end portion 304 of the friction member 166 to the interior cover part 132, the interior cover part includes a pocket 310 having an opening 312 on the inner surface 212 of the interior cover part 132. The pocket 310 receives the free end portion 304. The pocket can be provided with teeth (not shown) to engage the free end portion 304 thereby securing the friction member 166 to the interior cover part 132.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A lawn mower comprising:
a blade housing;
a height adjusting mechanism for adjusting a height of the blade housing with respect to the associated ground, the height adjusting mechanism includes rear wheel support members having axles secured thereto for supporting rear drive wheels; and
each rear drive wheel includes a cover having an exterior cover part and an interior cover part, the interior cover part of each cover directly connected to the support members without the use of separate associated mechanical fasteners,
wherein each interior cover part includes plural connectors which are integrally formed with the interior cover part to define a unitary component, the plural connectors of each cover provide for a snap-fit connection with one of the support members,
wherein each interior cover part has an inner wall portion that defines an opening for receiving the axle, and a first connector of the plural connectors is extended from the inner wall portion at the opening adjacent the axle and engages the respective support member,
wherein a second connector of the plural connectors extends from an inner facing wall of the interior cover part, the second connector engages one of an outer peripheral edge of the support member and an inner surface of the support member,
wherein a third connector of the plural connectors extends from the inner facing wall of the interior cover part, the third connector engages one of the outer peripheral edge of the support member and the inner surface of the support member.

2. The lawn mower of claim 1, wherein the first connector engages the outer peripheral edge of the support member.

3. The lawn mower of claim 1, wherein the second connector extends through an opening in the support member and engages the inner surface of the support member, and the third connector engages the outer peripheral edge of the support member.

4. The lawn mower of claim 1, wherein the second connector engages the inner surface of the support member, and the third connector engages the inner surface of the support member.

5. The lawn mower of claim 1, further including a transmission having an output shaft with a drive gear mounted on the end portion of the output shaft, the end portion extended through an opening in one of the interior cover parts to be received in a space defined by the respective cover, the one interior cover part includes a shroud covering the drive gear.

6. The lawn mower of claim 5, wherein the transmission includes a spring member, and the one interior cover part includes a pocket sized to securely receive a free end portion of the spring member.

7. A walk-behind lawn mower comprising:
a blade housing;
a height adjusting mechanism for adjusting a height of the housing with respect to the associated ground, the height adjusting mechanism includes rear wheel support members for supporting rear drive wheels; and
the rear drive wheels include covers, each cover having an exterior cover part and an interior cover part, the interior cover part including at least one connector integrally formed with the interior cover part to define a unitary component, the at least one connector configured for a snap-fit connection with each respective support member, wherein the at least one connector is plural connectors including a first connector and a second connector, each integrally formed with the interior cover part, one of the first connector and the second connector extends through an opening defined in the support member and directly engages an inner surface of the support member that faces away from the interior cover part.

8. The lawn mower of claim 7, wherein each interior cover part has an opening for receiving an axle secured to each support member, the first connector of the plural connectors is extended adjacent the axle and engages an outer peripheral edge of one of the support members.

9. The lawn mower of claim 8, wherein the second connector of the plural connectors extends from an inner facing wall of the interior cover part.

10. The lawn mower of claim 9, wherein a third connector of the plural connectors extends from the inner facing wall of the interior cover part, the third connector engages one of the outer peripheral edge of the support member and the inner surface of the support member.

11. A walk-behind lawn mower comprising:
a blade housing;
a height adjusting mechanism for adjusting a height of the housing with respect to the associated ground, the height adjusting mechanism includes rear wheel support members for supporting rear drive wheels; and
the rear drive wheels include covers, each cover having an exterior cover part and an interior cover part, the interior cover part including plural connectors each integrally formed with the interior cover part to define a unitary component, a first connector of the plural connectors engages an outer peripheral edge of one of the support members, a second connector of the plural connectors extends through an opening in the one support member and engages an inner surface of the one support member, wherein the plural connectors of the covers provide for a direct snap-fit connection with the support members thereby securing the covers to the support members without the use of separate associated mechanical fasteners.

\* \* \* \* \*